(12) United States Patent
Uchiyama

(10) Patent No.: US 10,500,610 B2
(45) Date of Patent: Dec. 10, 2019

(54) METHOD FOR PRODUCING ACTIVE MATERIAL COMPOSITE

(71) Applicant: Toyota Jidosha Kabushiki Kaisha, Toyota-shi, Aichi-ken (JP)

(72) Inventor: Takayuki Uchiyama, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 56 days.

(21) Appl. No.: 15/366,127

(22) Filed: Dec. 1, 2016

(65) Prior Publication Data

US 2017/0162856 A1 Jun. 8, 2017

(30) Foreign Application Priority Data

Dec. 4, 2015 (JP) .................................. 2015-237880

(51) Int. Cl.
*H01M 4/00* (2006.01)
*B05D 3/02* (2006.01)
(Continued)

(52) U.S. Cl.
CPC ............. *B05D 3/0254* (2013.01); *B05D 1/02* (2013.01); *H01M 4/366* (2013.01); *H01M 10/0525* (2013.01)

(58) Field of Classification Search
CPC .................................................... H01M 4/00
See application file for complete search history.

(56) References Cited

U.S. PATENT DOCUMENTS

| 6,338,832 B1* | 1/2002 | Brown ................... C01G 33/00 423/594.8 |
| 2013/0171526 A1 | 7/2013 | Miki et al. |

(Continued)

FOREIGN PATENT DOCUMENTS

| CN | 103107340 A | 5/2013 |
| CN | 103124695 A | 5/2013 |

(Continued)

OTHER PUBLICATIONS

Japanese patent application No. 2015-180392 filed Sep. 14, 2015—Inventor: Takayuki Uchiyama (not yet published).

(Continued)

*Primary Examiner* — David P Turocy
*Assistant Examiner* — Mohammad Mayy
(74) *Attorney, Agent, or Firm* — Dinsmore & Shohl LLP

(57) ABSTRACT

A method for producing an active material composite for all-solid-state lithium secondary batteries, the active material composite having a lithium niobate-containing coating layer on an active material surface, and the production method being able to decrease the content of a nitrogen element derived from a niobic acid raw material in the coating layer of the active material composite thus produced, and to decrease the reaction resistance of an all-solid-state lithium battery using the active material composite. The active material composite production method may comprise: preparing a coating liquid containing a peroxo complex of niobium and a lithium element, by use of a niobic acid in which a content of a nitrogen element contained as an impurity is 0.1% by mass or less, and forming the lithium niobate-containing coating layer on the active material surface by use of the coating liquid.

2 Claims, 1 Drawing Sheet

(51) Int. Cl.
*H01M 4/36* (2006.01)
*B05D 1/02* (2006.01)
*H01M 10/0525* (2010.01)

(56) References Cited

U.S. PATENT DOCUMENTS

2013/0209890 A1* 8/2013 Nagatomi .............. C01G 33/00
429/231.5
2016/0010221 A1* 1/2016 Doolittle ................ C25B 1/14
205/362

FOREIGN PATENT DOCUMENTS

| JP | 2012-074240 A | 4/2012 | | |
|---|---|---|---|---|
| JP | 2013-243107 A | 12/2013 | | |
| WO | WO 2006-029493 A1 * | 3/2006 | ............. | C01G 33/00 |

OTHER PUBLICATIONS

U.S. Appl. No. 15/261,110, filed Sep. 9, 2016—Inventor: Takayuki Uchiyama (corresponds to JP2015-180392A).

* cited by examiner

METHOD FOR PRODUCING ACTIVE MATERIAL COMPOSITE

RELATED APPLICATION

This application claims priority to Japanese Patent Application No. 2015-237880 filed on Dec. 4, 2015, the contents of which are hereby incorporated by reference into the present application.

TECHNICAL FIELD

The disclosure relates to a method for producing an active material composite.

BACKGROUND

An all-solid-state lithium secondary battery in which a solid electrolyte (e.g., a sulfide- or oxide-based solid electrolyte) is used as an electrolyte, has many advantageous such as high energy density and high power output.

For such an all-solid-state lithium secondary battery, it is known that active materials used in the electrodes are likely to be unstable and deteriorate. To avoid the problem, an electrode active material in which the surface is coated and protected with another component, is used. However, an all-solid-state lithium secondary battery using an electrode active material in which the surface is coated with lithium niobate, poses a new problem in that there is an increase in the reaction resistance.

In Patent Literature 1, a method for producing a cathode active material (a lithium-transition metal oxide powder) is disclosed, in which the surface is coated with lithium niobate by use of an aqueous solution containing a niobic acid complex and a lithium compound. According to the production method in Patent Literature 1, it is described that the content of carbon contained in the lithium-transition metal oxide powder in which the surface is coated with the lithium niobate, can be controlled to 0.03% by mass or less, so that carbon-induced lithium ion transfer inhibition can be suppressed, and the electrical resistance value (powder compact resistance) of the cathode active material can be decreased.

Patent Literature 1: Japanese Patent Application Laid-Open No. 2012-74240

SUMMARY

As a result of research studies, it has been found that the production method of Patent Literature 1 has difficulty in controlling the content of a nitrogen element in a coating layer, and there is an increase in the reaction resistance of an all-solid-state lithium secondary battery using such an electrode active material that the content of a nitrogen element in the coating layer is high. The reason is thought to be because, when a niobic acid that contains impurities including a nitrogen element is used as a raw material, the nitrogen element derived from the niobic acid raw material transfers to the coating layer of an active material thus produced and increases the reaction resistance.

One or more disclosed embodiments were achieved in light of the above circumstance. An object of one or more disclosed embodiments is to provide a method for producing an active material composite for lithium secondary batteries, the active material composite having a lithium niobate-containing coating layer on an active material surface. The production method is able to decrease the content of the nitrogen element derived from the niobic acid raw material in the coating layer of the active material composite thus produced, and to decrease the reaction resistance of the all-solid-state lithium battery using the active material composite.

In a first embodiment, there is provided a method for producing an active material composite for all-solid-state lithium secondary batteries, the active material composite having a lithium niobate-containing coating layer on an active material surface. The method comprises: preparing a coating liquid containing a peroxo complex of niobium and a lithium element, by use of a niobic acid in which a content of a nitrogen element contained as an impurity is 0.1% by mass or less, and forming the lithium niobate-containing coating layer on the active material surface by use of the coating liquid.

In the preparing of the coating liquid, the niobic acid in which the content of the nitrogen element contained as an impurity is 0.1% by mass or less, a hydrogen peroxide solution, a lithium hydroxide and an aqueous ammonia solution may be used.

According to the one or more embodiments disclosed and described herein, the method for producing the active material composite for lithium secondary batteries, the active material composite having the lithium niobate-containing coating layer on the active material surface, can be provided, the production method being able to decrease the content of the nitrogen element derived from the niobic acid raw material in the coating layer of the active material composite thus produced, and to decrease the reaction resistance of the all-solid-state lithium battery using the active material composite.

DETAILED DESCRIPTION

Figure 1:
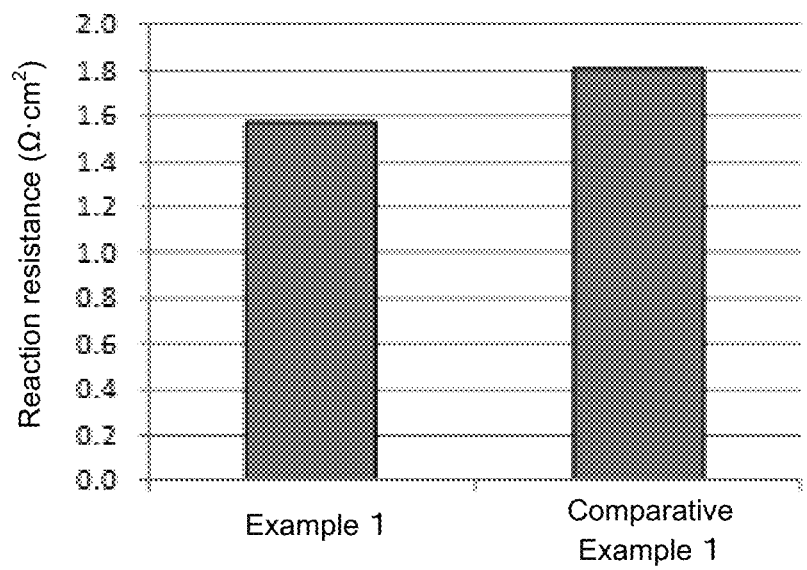
FIG. 1 is a view showing the evaluation results of the reaction resistances of the all-solid-state lithium batteries of Example 1 and Comparative Example 1.

The active material composite production method according to one or more embodiments disclosed and described herein is a method for producing an active material composite for all-solid-state lithium secondary batteries, the active material composite having a lithium niobate-containing coating layer on an active material surface, wherein the method comprises: preparing a coating liquid containing a peroxo complex of niobium and a lithium element, by use of a niobic acid in which a content of a nitrogen element contained as an impurity is 0.1% by mass or less, and forming the lithium niobate-containing coating layer on the active material surface by use of the coating liquid.

For an electrode active material composite in which the surface is coated with lithium niobate (hereinafter, it may be simply referred to as active material composite), it is known that the content of a carbon element in the coating layer has an influence on the reaction resistance of an all-solid-state lithium secondary battery using the active material (hereinafter, it may be simply referred to as battery). However, it is not known that the content of a nitrogen element derived from a niobic acid raw material in the coating layer has a large influence on the reaction resistance.

In one or more embodiments disclosed and described herein, by the use of the niobic acid as a raw material, in which the content of the nitrogen contained as an impurity is 0.1% by mass or less, an active material composite configured to provide small reaction resistance when used in a battery, can be produced.

Hereinafter, the steps of the production method of one or more embodiments disclosed and described herein will be described.

[Preparing of a Coating Liquid]

In the production method of one or more embodiments disclosed and described herein, the coating liquid containing the peroxo complex of niobium and the lithium element is prepared by the use of the niobic acid in which the content of the nitrogen element contained as an impurity is 0.1% by mass or less.

In embodiments, the niobic acid is a compound represented by the following chemical formula for the water-soluble niobic acid: $Nb_2O_5 \cdot nH_2O$. The water-soluble niobic acid is used as the peroxo complex, since $Nb_2O_5$ (niobium pentoxide that does not have hydration water) is insoluble in water. The water content in the niobic acid is not particularly limited.

In the production method of one or more embodiments disclosed and described herein, by the use of the niobic acid as a raw material, in which the content of the nitrogen contained as an impurity is 0.1% by mass or less, the active material composite configured to provide small reaction resistance when used in a battery, can be produced.

The nitrogen element contained as an impurity in the niobic acid that is a raw material in the coating liquid (hereinafter, it may be simply referred to as the nitrogen element contained in the niobic acid) is more likely to transfer to, especially, the coating layer of the active material composite, compared to a nitrogen element in the aqueous ammonia solution used as a supplementary material.

For example, when the aqueous ammonia solution is used as the alkaline solution of the below-described coating liquid, the proportion of the nitrogen element that transfers to the coating layer from the nitrogen element derived from the niobic acid raw material, is 10 or more times higher than that of the nitrogen element that transfers to the coating layer from the nitrogen element derived from the aqueous ammonia solution.

The reason why the nitrogen element derived from the niobic acid raw material in the coating liquid is more likely to transfer to the coating layer than the nitrogen element derived from the aqueous ammonia solution, is not clear yet. However, the reason is thought to be because they are present in chemically different states in the coating liquid.

It is not known that the content of the nitrogen contained in the niobic acid raw material used, has an influence on the reaction resistance of a battery using the active material composite thus produced. Therefore, it is difficult to maintain the quality of the active material composite constant.

In the production method of one or more embodiments disclosed and described herein, the coating liquid containing the peroxo complex of niobium and the lithium element is prepared by the use of the niobic acid.

The peroxo complex of niobium is a compound represented by the following formula (1):

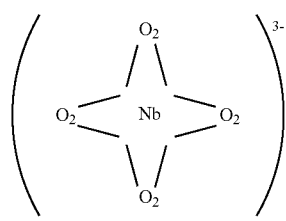

Formula (1)

The method for preparing the peroxo complex of niobium is not particularly limited. In general, the niobic acid raw material is added to an aqueous solution of an oxidant (e.g., hydrogen peroxide) and the mixture is further mixed with an aqueous solution of an alkaline agent (e.g., an aqueous ammonia solution), thereby preparing a clear solution containing the peroxo complex of niobium.

The niobic acid concentration of the coating liquid is not particularly limited. To efficiently coat the active material with the lithium niobate, it may be 0.1 to 0.2 mol/L.

As the aqueous solution of the oxidant, generally, an aqueous solution of hydrogen peroxide or the like can be used.

The oxidant concentration of the coating liquid is not particularly limited, as long as the peroxo complex of niobium can be efficiently produced. When the hydrogen peroxide solution is used, it may be 8 to 32 times the mol concentration of the niobic acid.

As the alkaline agent aqueous solution, an aqueous ammonia solution, a solution of LiOH, a solution of NaOH, or a solution of KOH can be used. When the aqueous ammonia solution is used, the nitrogen element in the ammonia transfers to the coating layer and may have an influence on the reaction resistance after endurance. However, the aqueous ammonia solution may be used as the alkaline agent aqueous solution, since it does not have a large influence on the initial reaction resistance of the battery, and it does not contain other metal ions.

The reaction resistance after endurance means a reaction resistance that gradually increases when the battery voltage is kept high. Therefore, it differs from the initial reaction resistance of the battery after its production, which is a problem that one or more embodiments disclosed and described herein aims to solve.

The concentration of the alkaline agent in the coating liquid is not particularly limited, as long as the peroxo complex solution of niobium can be efficiently produced. The coating liquid becomes a clear solution when a certain amount or more of cations are supplied from the alkaline agent to the peroxo complex of niobium; therefore, the cation concentration of the alkaline agent may be 6 to 12 times the mol concentration of the niobium element.

By adding a lithium compound to the thus-produced solution of the peroxo complex of niobium, the coating liquid containing the peroxo complex of niobium and the lithium element is prepared.

When a lithium compound containing a nitrogen element as a constituent element is used, such as $LiNO_3$, the nitrogen element transfers to the coating layer and may increase the reaction resistance of the battery. Therefore, in one or more embodiments disclosed and described herein, a lithium compound that does not contain a nitrogen element as a constituent element may be used as a raw material. As the lithium compound, examples include LiOH, $Li_2SO_4$, $Li_2CO_3$ and LiCl. From the viewpoint of availability of a raw material (the lithium compound) in which the content of the nitrogen element contained as an impurity is small, LiOH may be used.

The lithium compound concentration of the coating liquid is not particularly limited. To efficiently coat the active material with the lithium niobate, the mol concentration of the lithium element may be 0.95 to 1.05 times the mol concentration of the niobium element. Also, it may be 1.00 time the mol concentration of the niobium element.

[Forming of a Coating Layer]

According to the production method of one or more embodiments disclosed and described herein, the coating layer is formed on the active material surface by the use of the coating liquid prepared as described above. The method for forming the coating layer on the active material surface by the use of the coating liquid is not particularly limited. In general, first, the coating liquid is attached to the active material surface, and the moisture in the applied coating liquid is dried to form a lithium niobate precursor on the active material surface. The attached precursor is heated and converted into lithium niobate, thereby producing the active material composite in which the active material surface is coated with the lithium niobate.

Hereinafter, a general method for forming the coating layer on the active material surface by the use of the coating liquid will be described. The production method of the one or more embodiments disclosed and described herein is not limited to the method described below.

The active material used in the production method of the one or more embodiments disclosed and described herein is not particularly limited, as long as it is a material that is used as an electrode active material of a lithium secondary battery. Examples of such a material include $LiCoO_2$; $LiNiO_2$; Li—Mn spinels substituted with different elements, represented by $Li_{1+x}Ni_{1/3}Mn_{1/3}CO_{1/3}O_2$, $LiMn_2O_4$ and $Li_{1+x}Mn_{2-x-y}M_yO_4$ (where M is one or more metal elements selected from the group consisting of Al, Mg, Co, Fe, Ni and Zn); lithium metal phosphates represented by $Li_xTiO_y$ and $LiMPO_4$ (where M is one metal element selected from the group consisting of Fe, Mn, Co and Ni); transition metal oxides (e.g., $V_2O_5$, $MoO_3$); $TiS_2$; carbonaceous materials (C) such as graphite and hard carbon; LiCoN; $Li_xSi_yO_z$; lithium metals; lithium alloys represented by LiM (M is one or more metal elements selected from the group consisting of Sn, Si, Al, Ge, Sb, P and so on); lithium storage intermetallic compounds represented by $Mg_xM$ (M is one metal element selected from the group consisting of Sn, Ge and Sb) and $N_ySb$ (N is one metal element selected from the group consisting of In, Cu and Mn); and derivatives thereof. There are no clear criteria for determining whether the material is used as a cathode active material or as an anode active material. Accordingly, two materials that are different in lithium ion occluding/releasing potential (charge-discharge potential) are selected, and of the two materials, one that shows a noble potential can be used as a cathode active material, and the other that shows a base potential can be used as an anode active material.

To form the lithium niobate precursor on the active material surface by attaching the coating liquid to the active material surface and drying the moisture, a heretofore known film coating method in which the coating liquid is sprayed on the active material and dried, repeatedly, can be used. For such film coating, a commercially-available, fluidized-bed granulation coating device can be used.

Also, a heretofore known method of immersing the active material directly in the coating liquid and drying the same may be used, or a heretofore known method of spray-drying the coating liquid in which the active material is dispersed, may be used.

The thus-obtained active material in which the lithium niobate precursor is attached to the surface, is heated to form a coating layer in which the active material surface contains the lithium niobate, thereby obtaining the target active material composite. The heating can be carried out in the air atmosphere.

The heating temperature may be higher than 123° C. By heating at such a temperature, the amount of remaining impurities (volatile components) such as hydration water and the solvent of a complex solution can be decreased. Since hydration water prevents lithium ion conduction, the reaction resistance can be decreased by decreasing the amount of the hydration water. Also, the active material composite obtained by the production method of the one or more embodiments disclosed and described herein is used in an all-solid-state battery using a sulfide solid electrolyte, for example. The sulfide solid electrolyte is deteriorated by reaction with water and, as a result, the reaction resistance of the all-solid-state battery is likely to increase. Therefore, by decreasing the amount of the remaining solvent of the complex solution, the reaction resistance of the battery can be decreased.

Also, the heating temperature may be less than 350° C. If the heating temperature is high, many pores are likely to be formed in the lithium niobate and, as a result, the BET specific surface area of the active material composite is likely to increase. Since the pores prevent lithium ion conductivity, they contribute to an increase in the reaction resistance of the battery. To decrease the reaction resistance of the battery, it is effective to decrease the number of the pores in the lithium niobate. To decrease the number of the pores, it is effective to decrease the heating temperature. By setting the heating temperature to less than 350° C., the number of the pores in the lithium niobate can be decreased; therefore, the reaction resistance can be decreased.

Also, by setting the heating temperature to 350° C. or more, the lithium niobate precursor is crystallized on the surface of the active material. Since the lithium ion conductivity of crystallized lithium niobate is lower than that of non-crystallized lithium niobate, crystallized lithium niobate contributes to an increase in the reaction resistance of a battery. To decrease the reaction resistance of a battery, it is effective to prevent lithium niobate from crystallization. To prevent lithium niobate from crystallization, it is effective to set the heating temperature to less than the predetermined temperature. By setting the heating temperature to less than 350° C., lithium niobate can be prevented from crystallization; therefore, the reaction resistance of a battery can be decreased.

Hereinafter, the active material composite obtained by the production method of the one or more embodiments disclosed and described herein will be described.

The active material composite obtained by the production method of the one or more embodiments disclosed and described herein has the lithium niobate-containing coating layer on the active material surface, and it can be used as both the cathode and anode active materials of the all-solid-state lithium secondary battery.

The active material composite is not particularly limited, as long as the electrode active material surface is coated with the lithium niobate. To prevent the active material from deteriorating, etc., 90% or more of the active material surface may be coated with the lithium niobate, and 95% or more of the active material surface may be coated with the lithium niobate.

For the active material composite obtained by the production method of the one or more embodiments disclosed and described herein, the nitrogen element derived from the niobic acid raw material in the coating layer is decreased. Decreasing the nitrogen element derived from the niobic acid raw material is more effective in decreasing the initial reaction resistance of the battery, than decreasing the nitrogen element contained in the aqueous ammonia solution used as a supplementary material.

The nitrogen element derived from the aqueous ammonia solution used as a supplementary material in the coating liquid, has almost no influence on the initial reaction resistance of the battery. However, the nitrogen element derived from the impurities in the niobic acid has a very large influence on the initial reaction resistance of the battery.

The reason why decreasing the nitrogen element derived from the impurities in the niobic acid raw material in the coating layer, is more effective in decreasing the initial reaction resistance of the battery compared to decreasing the nitrogen element derived from the aqueous ammonia solution used as a supplementary material, is not clear yet. However, the reason is thought to be because the nitrogen elements are present in chemically different states in the coating layer.

EXAMPLES

Example 1

(Preparing of a Coating Liquid)

First, 989.9 g of ion-exchanged water and 41.7 g of $Nb_2O_5 \cdot nH_2O$ ($Nb_2O_5$ content 77% by mass, water content 17% by mass, nitrogen content 0.1% by mass or less) were added to 870.1 g of a 30% by mass hydrogen peroxide solution. Next, 87.9 g of an aqueous ammonia solution at a concentration of 28% by mass was added to the mixed solution and sufficiently stirred, thereby obtaining a peroxo complex solution of niobium.

Then, 10.1 g of $LiOH \cdot H_2O$ was added to the thus-obtained peroxo complex solution of niobium, thereby obtaining a clear coating solution in which the peroxo complex of niobium and the lithium element are contained at a mol concentration of the niobium and lithium elements of 0.12 mol/kg. This coating solution will be referred to as the coating solution of Example 1.

(Forming of a Coating Layer)

Using a coating device (product name: MP-01; manufactured by: Powrex Corporation), 2000 g of the coating liquid thus prepared was sprayed onto 1000 g of $LiNi_{1/3}Mn_{1/3}Co_{1/3}O_2$ (an active material manufactured by: Nichia Corporation) to coat the active material with the coating liquid. The operation conditions of the coating device are as follows: nitrogen was used as an intake air, at an intake air temperature of 120° C., an intake air flow rate of 0.4 $m^3$/min, a rotor rotational frequency of 400 rpm, and a spray velocity of 4.5 g/min.

After the active material was absolutely coated, it was heated at 200° C. for 5 hours in the air, thereby obtaining an active material composite. This active material composite will be referred to as the active material composite of Example 1.

Comparative Example 1

A clear coating liquid and an active material composite were obtained in the same manner as Example 1, except that 987.4 g of ion-exchanged water and 44.2 g of $Nb_2O_5 \cdot nH_2O$ ($Nb_2O_5$ content 72% by mass, water content 16% by mass, nitrogen content of 3.4% by mass) were added. The coating liquid and active material composite will be referred to as the coating liquid and active material composite of Comparative Example 1.

Comparative Example 2

A clear coating liquid was obtained in the same manner as Comparative Example 1, except that the concentration of the aqueous ammonia solution used in Comparative Example 1 was changed to 21% by mass. The coating liquid will be referred to as the coating liquid of Comparative Example 2. In Comparative Example 2, the formation of the coating layer was not carried out.

Comparative Example 3

A clear coating liquid was obtained in the same manner as Comparative Example 1, except that the concentration of the aqueous ammonia solution used in Comparative Example 1 was changed to 17.5% by mass. The coating liquid will be referred to as the coating liquid of Comparative Example 3. In Comparative Example 3, the formation of the coating layer was carried out.

Comparative Example 4

It was tried to prepare a clear coating liquid in the same manner as Comparative Example 1, except that the concentration of the aqueous ammonia solution used in Comparative Example 1 was changed to 14% by mass. However, the clear coating liquid of Comparative Example 4 was not obtained.

[Evaluation of Coating Layers]

By the following direct and indirect methods, the lithium niobate-containing coating layers were evaluated.

1. Measurement of the Contents of Elements (N, Nb and Li) in the Coating Layer

Using a hot plate, the coating liquid of Example 1 was dried at 120° C. and then heated at 200° C. for 5 hours, thereby obtaining a sample. The same applied to the coating liquid of Comparative Example 1. Nitrogen in each sample was quantitatively analyzed by the inert gas fusion method. Also, the constituent elements of the lithium niobate layer in each sample, that is, lithium and niobium, were quantitatively analyzed by the ICP emission spectroscopic analysis. TC-436AR (manufactured by: LECO) was used for the analysis by the inert gas fusion method. An ICP emission spectroscopic analyzer (product name: ICPS-8000; manufactured by: Shimadzu Corporation) was used for the analysis by the ICP emission spectroscopic analysis.

2. Evaluation of the Reaction Resistances of all-Solid-State Lithium Batteries Using Active Material Composites (Preparing of all-Solid-State Lithium Batteries for Evaluation)

The above-obtained active material composite of Example 1 and a sulfide-based solid electrolyte ($Li_3PS_4$) at a volume ratio of 6:4 were put in a container in which heptane was contained. In addition, a conductive additive (vapor-grown carbon fibers manufactured by: Showa Denko K. K.) in an amount that is 3% by mass with respect to the active material composite of Example 1 and a binder (a butylene rubber manufactured by: JSR Corporation) that is in an amount of 3% by mass with respect to the active material composite of Example 1, were put in the container in which the heptane and so on were contained, thereby producing a cathode slurry. Then, the cathode slurry was dispersed by a ultrasonic homogenizer (product name: UH-50; manufactured by: SMT Co., Ltd.) to obtain a cathode composition. The cathode composition was applied to the upper surface of an aluminum foil and dried at 100° C. for 30 minutes, thereby forming a cathode on the upper surface of the aluminum foil. Next, the aluminum foil having the cathode formed on the upper surface thereof was punched in a size of 1 $cm^2$, thereby obtaining a cathode electrode.

Meanwhile, an anode active material (layered carbon) and a sulfide-based solid electrolyte ($Li_3PS_4$) at a volume ratio of 6:4 were put in a container in which heptane was contained. In addition, a binder (a butylene rubber manufactured by: JSR Corporation) in an amount that is 1.2% by mass with respect to the anode active material, was put in the container in which the heptane, the anode active material and so on were contained, thereby producing an anode slurry. Then, the anode slurry was dispersed by the ultrasonic homogenizer to obtain an anode composition. The anode composition was applied to the upper surface of a copper foil and dried at 100° C. for 30 minutes, thereby forming an anode on the upper surface of the copper foil. Next, the copper foil having the anode formed on the upper surface thereof was punched in a size of 1 cm$^2$, thereby obtaining an anode electrode.

Next, 64.8 mg of a sulfide-based solid electrolyte ($Li_3PS_4$) was put in a cylindrical ceramic having an inner diameter cross-sectional area of 1 cm$^2$. The surface of the sulfide-based solid electrolyte was made flat and smooth and then pressed at a pressure of 98 MPa, thereby forming a separator layer. Then, the cathode and anode electrodes were put in the cylindrical ceramic so that the separator layer is placed between the cathode and anode electrodes. The ceramic was pressed at a pressure of 44.4 MPa for one minute. Then, a stainless-steel rod was put in each of the cathode electrode side and the anode electrode side and bonded at a pressure of 98 MPa, thereby producing an all-solid-state lithium battery. This battery will be referred to as the all-solid-state lithium battery of Example 1. Another all-solid-state lithium battery was produced in the same manner as Example 1, except that the active material composite of Comparative Example 1 was used. This battery will be referred to as the all-solid-state lithium battery of Comparative Example 1.

(Measurement of the Reaction Resistances of the all-Solid-State Lithium Batteries)

The all-solid-state lithium batteries of Example 1 and Comparative Example 1 were each charged to a voltage of 4.5 V and then discharged to 2.5 V. Then, the AC impedance of the all-solid-state lithium batteries was measured at 3.6 V. For the measurement, an AC impedance measuring device (product name: SI1260; manufactured by: Solartron Analytical) was used.

The reaction resistance ($\Omega \cdot cm^2$) of each all-solid-state lithium battery was identified from one arc obtained by the Nyquist plot of the measurement results.

3. Evaluation of the Lithium Ion Conductivity of the Coating Layer (Producing of Evaluation Cells)

Using a hot plate, the coating liquid of Example 1 was dried at 120° C. and then heated at 200° C. for 5 hours, thereby obtaining a sample. This sample will be referred to as the sample of Example 1. The same applied to the coating liquids of Comparative Examples 1 to 3. Samples thus obtained will be referred to as the samples of Comparative Examples 1 to 3.

Next, 100 mg of the sample of Example 1 was put in a cylindrical ceramic container having an inner diameter cross-sectional area of 1 cm$^2$. The surface of the sample was smoothed, and then the sample was pressed at a pressure of 44.4 MPa for one minute so as to be in a flat plate form. Then, two stainless-steel rods were put in the cylindrical ceramic container so that the sample in the flat plate form is placed between the stainless-steel rods. Then, the rods were bonded at a pressure of 98 MPa, thereby producing a lithium ion conductivity evaluation cell. This cell will be referred to as the lithium ion conductivity evaluation cell of Example 1. The same applied to the samples of Comparative Examples 1 to 3. The thus-obtained cells will be referred to as the lithium ion conductivity evaluation cells of Comparative Examples 1 to 3.

(Measurement of the Lithium Ion Conductivity of the Coating Layer)

AC impedance measurement was carried out on the lithium ion conductivity evaluation cells of Example 1 and Comparative Examples 1 to 3. An AC impedance measuring device (product name: SI1260; manufactured by: Solartron Analytical) was used for the measurement.

For each cell, an arc was obtained by the Nyquist plot of the measurement results and determined as lithium ion conductivity ($S \cdot cm^{-1}$).

[Evaluation Results]

The measurement results of the contents of N, Nb and Li in the coating layer are shown in Table 1.

TABLE 1

| | Li (mol/100 g) | Nb (mol/100 g) | N (mol/100 g) |
|---|---|---|---|
| Example 1 | 0.62 | 0.62 | 0.11 |
| Comparative Example 1 | 0.64 | 0.57 | 0.21 |

No large difference was found in the Nb and Li contents between Example 1 (in which the niobic acid in which the content of the nitrogen element contained as an impurity is 0.1% by mass or less was used) and Comparative Example 1 (in which the niobic acid in which the content of the nitrogen element contained as an impurity is 3.2% by mass was used).

However, while the N content is 0.11 mol/100 g in Example 1, it is 0.21 mol/100 g in Comparative Example 1 and is almost twice the N content in Example 1.

The nitrogen element contained as an impurity in the niobic acid used for the preparation of the coating liquid of Example 1, is equal to or less than the detection limit (0.1% by mass) and almost no nitrogen is contained. Therefore, it was thought that the nitrogen in the coating layer detected in Example 1 is derived from the ammonia in the coating liquid. That is, it was thought that 0.11 mol/100 g of the nitrogen element (0.21 mol/100 g) contained in the coating layer of Comparative Example 1, is derived from the ammonia, and 0.10 mol/100 g is derived from the nitrogen element contained as an impurity in the niobic acid.

Of the nitrogen element contained in the coating liquid (2000 g) of Comparative Example 1, according to calculations, the nitrogen element of the ammonia is 19.1 g, and the nitrogen element contained as an impurity in the niobic acid is 1.5 g. Therefore, the nitrogen element in the ammonia is 10 times or more the nitrogen element contained as an impurity in the niobic acid.

Therefore, it is clear that the nitrogen element contained as an impurity in the niobic acid is likely to transfer to the coating layer of the active material composite, and the content of the nitrogen derived from the impurity in the niobic acid raw material in the coating layer of the active material composite can be decreased by the use of the niobic acid in which the content of the nitrogen element contained as an impurity is 0.1% by mass or less.

The evaluation results of the reaction resistances of the all-solid-state lithium batteries using the active material composites of Example 1 and Comparative Example 1, are shown in FIG. 1.

As shown in FIG. 1, the reaction resistance of the all-solid-state lithium battery using the active material composite of Example 1 is 1.57 $\Omega \cdot cm^2$ and is significantly lower than 1.81 $\Omega \cdot cm^2$ in Comparative Example 1.

As described above, according to the elemental analysis results, there is no large difference except for the content of the nitrogen element. Therefore, it is thought that the significant decrease in the reaction resistance is due to the decrease in the content of the nitrogen element derived from the impurity in the niobic acid raw material in the coating layer.

Figure 2:
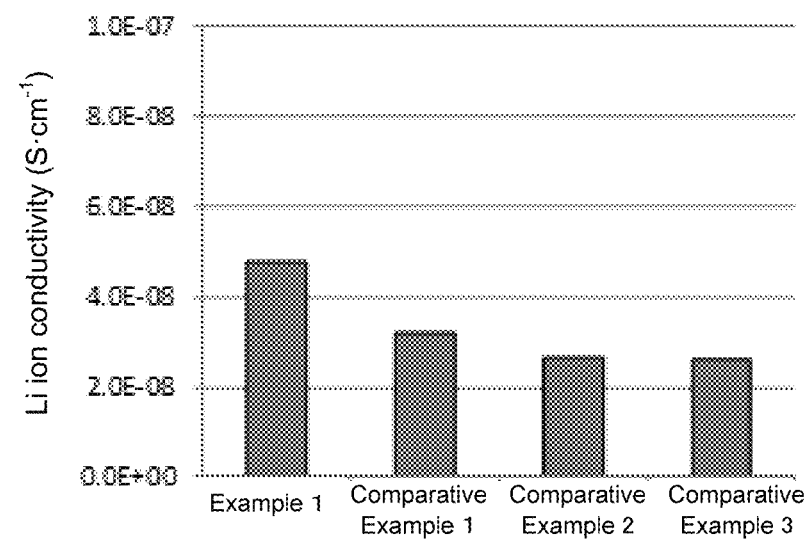
FIG. 2 is a view showing the evaluation results of the lithium ion conductivities of the coating layers of Example 1 and Comparative Examples 1 to 3.

The evaluation results of the lithium ion conductivities of the coating layers of Example 1 and Comparative Examples 1 to 3 are shown in FIG. 2.

This test is a simplified evaluation of the lithium conductivities of the active material composites. From the relationship between the data of Example 1 and Comparative Example 1 in FIGS. 1 and 2, it is clear that when the lithium ion conductivity of the coating layer is high in this test, the reaction resistance of the all-solid-state lithium battery is low.

The concentration of the aqueous ammonia solution used varies among Comparative Examples 1 to 3; therefore, the content of the nitrogen element in the coating liquid decreases in the following order: Comparative Example 1>Comparative Example 2>Comparative Example 3.

Also, it is thought that the concentration of the nitrogen element derived from the aqueous ammonia solution in the coating liquid does not make a large difference in the proportion of the nitrogen element transferred to the coating layer. Therefore, it is thought that the nitrogen content in the lithium conductivity evaluation samples used in Comparative Examples 1 to 3 also decreases in the following order: Comparative Example 1>Comparative Example 2>Comparative Example 3.

However, as shown in FIG. 2, even though the content of the nitrogen element derived from the ammonia in the coating liquid was decreased, the lithium conductivity of the coating layer could not be increased, that is, the reaction resistance of the all-solid-state lithium battery could not be decreased.

Therefore, to decrease the reaction resistance of the all-solid-state lithium battery, it is quite important to decrease the nitrogen element derived from the impurity in the niobic acid that is a raw material in the coating layer of the active material composite used. That is, in the production of the active material composite, the content of the nitrogen element contained as an impurity in the niobic acid that is used as a raw material, is quite important.

From the above results, it is clear that the reaction resistance of the all-solid-state lithium battery using the active material composite produced by the method for producing the active material composite for lithium secondary batteries according to the one or more embodiments disclosed and described herein can be decreased, wherein the method comprises: preparing the coating liquid containing the peroxo complex of niobium and the lithium element, by use of the niobic acid in which the content of the nitrogen element contained as an impurity is 0.1% by mass or less, and forming the lithium niobate-containing coating layer on the active material surface by the use of the coating liquid.

The invention claimed is:

1. A method for producing an active material composite for all-solid-state lithium secondary batteries, the active material composite having a lithium niobate-containing coating layer on an active material surface,
   wherein the method comprises:
   preparing a coating liquid containing a peroxo complex of niobium and a lithium element, by use of a water-soluble niobic acid having formula $Nb_2O_5 \cdot nH_2O$ and in which a content of a nitrogen element contained as an impurity is 0.1% by mass or less and a ratio of the $Nb_2O_5$ to water in the water-soluble niobic acid is 77:17 by mass, and
   forming the lithium niobate-containing coating layer on the active material surface by use of the coating liquid.

2. The method for producing the active material composite according to claim 1, wherein the water-soluble niobic acid having the formula $Nb_2O_5 \cdot nH_2O$ in which the content of the nitrogen element contained as an impurity is 0.1% by mass or less, a hydrogen peroxide solution, a lithium hydroxide and an aqueous ammonia solution are used in the preparing of the coating liquid.

* * * * *